(12) United States Patent
Baer et al.

(10) Patent No.: US 10,750,331 B2
(45) Date of Patent: Aug. 18, 2020

(54) METHOD AND APPARATUSES FOR OPT-IN TO AND OPT-OUT FROM RECEIVING A2P MESSAGES

(71) Applicant: Telia Company AB, Solna (SE)

(72) Inventors: Anders Baer, Årsta (SE); Maria Jernström, Vega (SE)

(73) Assignee: Telia Company AB, Solna (SE)

( * ) Notice: Subject to any disclaimer, the term of this patent is extended or adjusted under 35 U.S.C. 154(b) by 0 days.

(21) Appl. No.: 16/356,009

(22) Filed: Mar. 18, 2019

(65) Prior Publication Data

US 2019/0297471 A1    Sep. 26, 2019

(30) Foreign Application Priority Data

Mar. 23, 2018 (SE) ..................... 1850326

(51) Int. Cl.
*H04W 4/16* (2009.01)
*H04W 4/14* (2009.01)
(Continued)

(52) U.S. Cl.
CPC .............. *H04W 4/16* (2013.01); *H04L 51/14* (2013.01); *H04W 4/14* (2013.01); *H04W 68/00* (2013.01);
(Continued)

(58) Field of Classification Search
CPC ..... G06K 2009/00738; G06K 9/00711; G06K 9/00765; G06K 9/3241; G06K 9/2081; G06K 9/00744; G06K 9/00288; G06K 9/6227; G06K 9/6267; G06K 9/628; H04W 12/06; H04W 12/08; H04W 12/0013; H04W 12/04; H04W 4/80; H04W 84/12; H04W 4/029; H04W 40/20; H04W 4/022; H04W 92/18; H04W 4/50; H04W 8/22;
(Continued)

(56) References Cited

U.S. PATENT DOCUMENTS

2009/0265220 A1    10/2009  Bayraktar et al.
2010/0306249 A1*   12/2010  Hill ........................ G06Q 30/02
                                                          707/769
(Continued)

OTHER PUBLICATIONS

European Search Report, App. No. 19162890.8-1216, dated Jun. 19, 2019, European Patent Office, Munich, Germany.
(Continued)

*Primary Examiner* — Nimesh Patel
(74) *Attorney, Agent, or Firm* — Burr & Forman LLP; Jeffrey H. Kamenetsky (57) ABSTRACT

The embodiments herein relate to a method in a UE (201) and a method in an application server (205) for allowing a user of the UE (201) to control the type of service messages to receive and also control what type of content is of interest for the user. The method in the UE (201) comprises: establishing a session with the application server (205); transmitting a message to said application server (205), wherein the message includes user preferences relating to services or campaigns that the user of the UE (201) is interested in; and (107, 109) receiving at least one Application-to-Person, A2P, message including information on said services or campaigns that fulfil the requirements of the user in accordance with the user preferences.

15 Claims, 9 Drawing Sheets

(51) Int. Cl.
*H04W 68/00* (2009.01)
*H04W 88/02* (2009.01)
*H04W 88/18* (2009.01)
*H04L 12/58* (2006.01)

(52) U.S. Cl.
CPC ....... *H04W 88/023* (2013.01); *H04W 88/184* (2013.01); *H04L 51/02* (2013.01); *H04L 51/20* (2013.01)

(58) Field of Classification Search
CPC ..... H04W 4/90; H04W 76/50; H04W 68/005; H04W 48/02; H04W 4/12; H04W 88/18; H04W 12/00503; H04W 48/18; H04W 4/023; H04W 4/08; H04W 60/00; H04W 60/005; H04W 76/00; H04W 8/18; H04W 8/183; H04W 88/02; H04W 88/06; H04W 8/24; G06F 3/04842; G06F 3/0488; G06F 3/0481; G06F 3/0482; G06F 3/04817; G06F 16/743; G06F 16/7328; G06F 16/738; G06F 16/24578; G06F 16/95; G06F 16/9535; G06F 21/35; G06F 16/29; G06F 16/48; G06F 16/955; G06F 3/04815; G08B 13/19682; G08B 13/19684; G08B 13/19615; G08B 13/19608; G08B 13/1966; G08B 13/19656; G08B 13/19673; G08B 13/19691; G08B 25/001; G08B 25/016; G08B 27/001; G08B 25/14; H04L 67/10; H04L 63/083; H04L 2209/80; H04L 63/0428; H04L 9/0822; H04L 12/2829; H04L 41/0879; H04L 12/282; H04L 2012/2841; H04L 67/02; H04L 12/1813; H04L 14/22; H04L 47/826; H04L 51/10; H04L 65/403; H04L 67/306; H04L 63/102; H04L 51/32; H04L 67/18; H04L 51/00; H04L 51/20; H04L 51/36; H04L 51/38; H04L 65/1016; H04L 65/105; H04L 65/4069; H04L 67/22; H04L 51/02; H04L 51/14; G06Q 50/01; G06Q 30/02; G06Q 30/0207; G06Q 30/0241; G06Q 30/0645; G06Q 30/0261; G06Q 30/0224; G06Q 30/0225; G06Q 30/0235; G06Q 30/0201; G06Q 30/0202; G06Q 30/0242; G06Q 30/0251; G06Q 30/0267; G06Q 30/0276; G06Q 30/0601; G06Q 30/0621; G06Q 30/0631; G06Q 30/0643; G07C 2009/00769; G07C 2209/64; G07C 9/00007; G07C 9/00031; G07C 9/00103; G07C 9/00571; H04M 15/85; H04M 3/42348; H04M 3/4878; H04M 3/5233

See application file for complete search history.

(56) References Cited

U.S. PATENT DOCUMENTS

| | | | |
|---|---|---|---|
| 2012/0303439 A1 | 11/2012 | Flitcroft et al. | |
| 2013/0085856 A1 | 4/2013 | Vlad et al. | |
| 2013/0196627 A1 | 8/2013 | Ng et al. | |
| 2013/0318199 A1* | 11/2013 | Le Jouan | G06Q 10/10 709/217 |
| 2014/0279050 A1 | 9/2014 | Maker et al. | |
| 2015/0169284 A1 | 6/2015 | Quast et al. | |
| 2015/0228134 A1* | 8/2015 | Tehranchi | G07C 9/00111 340/5.61 |
| 2015/0269654 A1* | 9/2015 | Keshavamurthy | G06Q 30/0635 705/26.8 |
| 2015/0289117 A1* | 10/2015 | Huang | H04W 4/14 455/466 |
| 2015/0311721 A1* | 10/2015 | Uppal | G05B 15/02 700/287 |
| 2016/0099892 A1* | 4/2016 | Palakovich | H04L 51/04 709/206 |
| 2016/0323725 A1* | 11/2016 | Lew | H04W 4/14 |
| 2017/0012907 A1* | 1/2017 | Smullen | H04L 51/046 |
| 2018/0338226 A1* | 11/2018 | Bendi | H04W 4/14 |

OTHER PUBLICATIONS

Office Action dated Oct. 1, 2019, issued from the Swedish Patent and Registration Office dated Oct. 1, 2019, for Swedish Application No. 1850326-8.

Swedish Search Report, App. No. 1850326-8, dated Oct. 4, 2018, pp. 1-8, Swedish Patent and Registration Office, Stockholm, Sweden, Ewa Björk.

* cited by examiner

METHOD AND APPARATUSES FOR OPT-IN TO AND OPT-OUT FROM RECEIVING A2P MESSAGES

TECHNICAL FIELD

The present disclosure relates to the field of data communications, and in particular to a user equipment, a method thereof, an application server and a method thereof for allowing a user opting-in to, and/or opting-out from, receiving messages from individual companies.

BACKGROUND

A communication device or a User Equipment (UE) such as a mobile phone may be able to be in communication with other user devices through the cellular network of an operator with which the user of the device has an account. A variety of different types of services may be offered by the operator to the user, including services that permit a messaging service message, e.g., Short Message Service (SMS), Multimedia Messaging Service (MMS), and Rich Communication Suite (RCS) service to be transmitted to/from the device through the operator's mobile network.

RCS is a developed service-type that can be used in the IP Multimedia Subsystem (IMS) domain which uses the Session Initiation Protocol (SIP) as signaling protocol. RCS permits users to query device capabilities and/or application-level multimedia capabilities from their contacts, such that a user device can upgrade a communication from plain text SMS to enable "rich communication", such as Voice over LTE (VoLTE), video calls, Instant Messaging (IM), file or image sharing, etc., based on the real-time capabilities of the contacts. RCS also offers a delivery channel for businesses to communicate with their staff, existing and potential customer base, Machine-to-Machine (M2M) applications and Internet-of-Things (IoT) applications.

In order for a UE to use RCS services, the UE needs a RCS client on the device. The user is asked to accept or reject the use of RCS, this is for using the RCS application as such. SMS does not require an access/reject by the user whereas iMessage is enabled automatically and transparently to the user out of the box. RCS is made available to the user via manual software upgrade or upgraded via Over-The-Air (OTA).

A problem with those messaging applications is that whatever is sent to the user, the messages are received. This might not be a problem for Person-to-Person (P2P) communication but with the increased use of, e.g., RCS business messaging that employs Application-to-Person (A2P) communication services, this might be an issue. The same applies for IMS/SIP messaging employing A2P services or to any other messaging application employing A2P services. It is therefore important that the user can control what type of messages or information to receive and also control the content of messages to the proper level.

SUMMARY

It is an object of embodiments herein to solve the above problems by providing a user equipment, an application server and methods for allowing a user opting-in to, and/or opting-out from, receiving messages from individual companies or from different companies. This way, the user may control the type of service messages to receive and also control what type of content is of interest for the user.

According to an aspect of embodiments herein, there is provided a method performed by a UE, the method comprising: establishing a session with an application server; transmitting a message to said application server, wherein the message includes user preferences relating to services or campaign messages that the user of the UE is interested in; and receiving at least one A2P message including information on said services or campaign messages that fulfil the requirements of the user in accordance with the user preferences.

According to another aspect of embodiments herein, there is provided a method performed by an application server, the method comprising: establishing a session with a UE; receiving a message from said UE, wherein the message includes user preferences relating to services or campaign messages that the user of the UE is interested in; and transmitting at least one A2P message including information on said services or campaign messages that fulfil the requirements of the user in accordance with the user preferences.

According to another aspect of embodiments herein, there is provided a UE comprising a processor and a memory containing instructions executable by the processor, wherein the UE is operative to: establish a session with an application server; transmit a message to said application server, wherein the message includes user preferences relating to services or campaign messages that the user of the UE is interested in; and receive at least one A2P message including information on said services or campaign messages that fulfil the requirements of the user in accordance with the user preferences.

According to another aspect of embodiments herein, there is provided an application server, the application server comprising a processor and a memory containing instructions executable by the processor, wherein the application server is operative to: establish a session with a UE; receive a message from said UE, wherein the message includes user preferences relating to services or campaign messages that the user of the UE is interested in; and transmit, to the UE, at least one A2P message including information on said services or campaign messages that fulfil the requirements of the user in accordance with the user preferences.

An advantage with embodiments herein is to allow the user of a UE to opt-in to receive information messages on services, campaigns, categories of products, etc., that fulfil the requirements of the user according with the user preferences.

Another advantage with embodiments herein is to allow the user to opt-out from receiving information messages that do not comply with the user preferences.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Figure 1A:
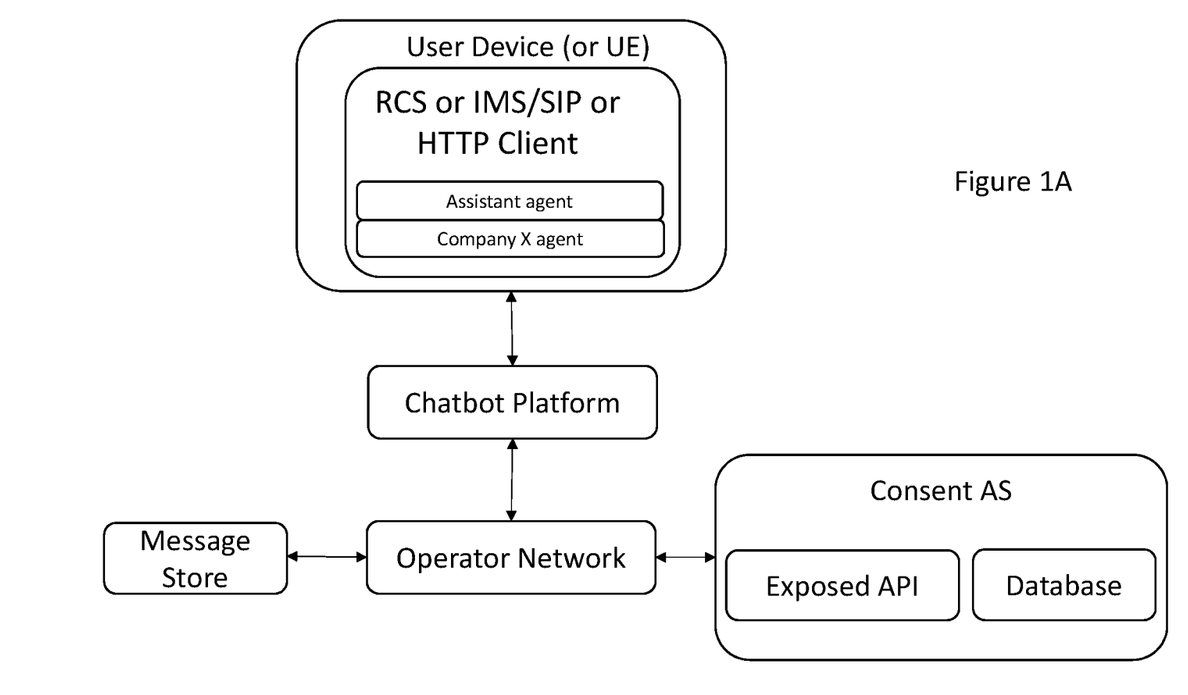
FIG. 1A illustrates a schematic overview of an architecture wherein some embodiments herein may be employed.

Referring to FIG. 1A, there is illustrated a network architecture wherein some embodiments herein may be employed. As shown, a user device or UE is provided with a client application which may be used to start a conversation with an assistant agent of a company X. As will be described and illustrated, the client application may use RCS or IMS/SIP or HTTP protocols to perform the actions of opt-in/opt-out. Any suitable client protocol may also be used. A user may find a company chatbot platform by browsing a chatbot catalogue or, as in this case, start a conversation with an assistant agent of a company that helps the user to opt-in to A2P messaging. This can be useful when a user does not known which company can deliver a product the user is interested in. The user of the UE may access the assistant bot through different means: a contact in the RCS or IMS/SIP or HTTP client; by opening a menu in a downloaded plug-in for the RCS or IMS/SIP client; by accessing another suitable client application, or by accessing a web-interface. The user, by means of the UE, may enter user preferences which are then sent towards an application server (AS) via a network of an operator. The network may be a IMS-based network. It should mentioned that RCS is implemented on top of the IMS which is the underlying platform.

It should be noted that although RCS or IMS/SIP or HTTP are used herein, these are only examples of messaging services that may be used in the invention. The embodiments herein are therefore not restricted to RCS or IMS/SIP or HTTP. Instead any service employing A2P messaging can be used in the invention according to the present embodiments. Therefore, any type of client application that allows a user to receive A2P messages in accordance with the embodiments herein may be used.

Figure 1B:
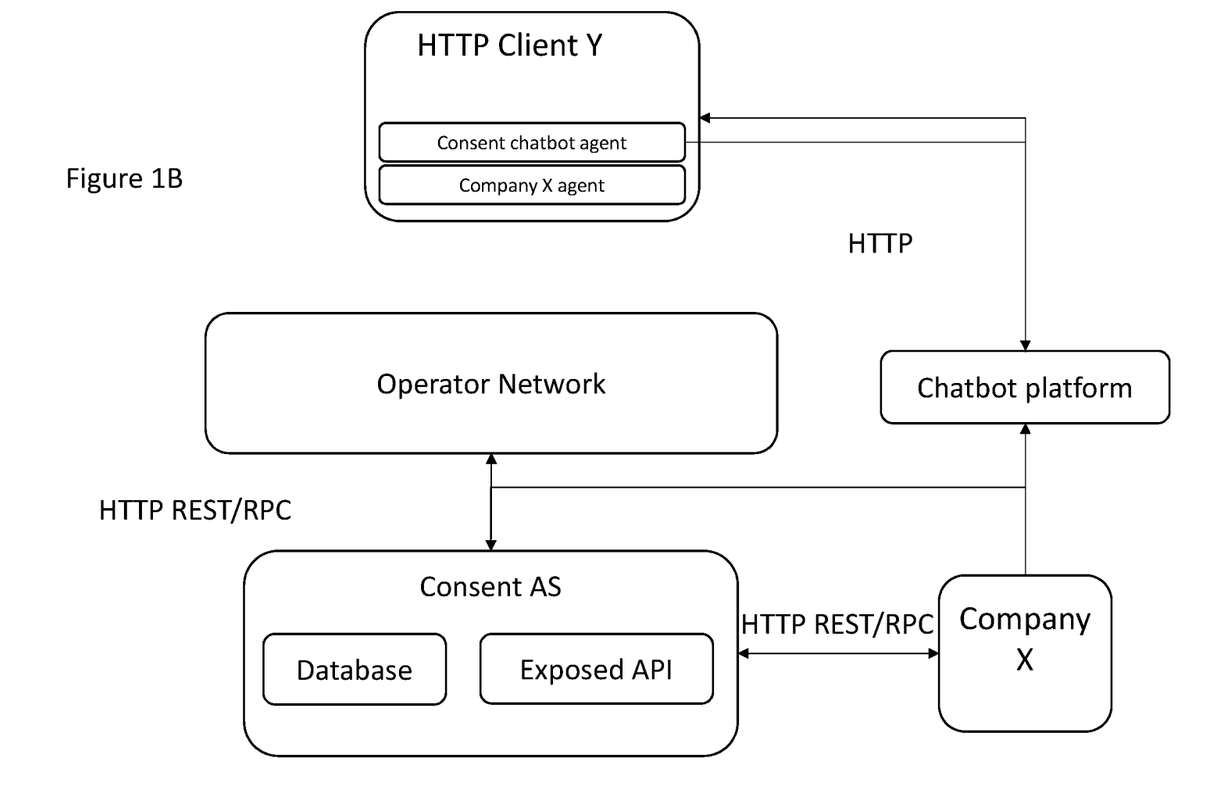
FIG. 1B illustrates another schematic view of an architecture wherein an exemplary embodiment herein may be employed.

FIG. 1B illustrates an exemplary network architecture wherein some embodiments herein may be employed. In this example the user device is shown provided with a HTTP client. HTTP uses REST (Representational state transfer) and/or RPC (Remote Procedure Control) for transmission of messages between, e.g., company X and the content AS. A detailed description involving the entities shown in FIG. 1A is described in conjunction with FIG. 6.

As shown in FIGS. 1A-1B, the application server (AS) (referred to here as a consent AS) may be provided with an exposed Application Programming Interface (API) for allowing user preferences to be exposed to companies, enterprises, aggregators and other operators, that have connections to the consent AS. The user preferences may be stored in a databased available to the content AS. A message store may also be provided (see FIG. 1A) for storing messages for subsequent delivery to the user device. Note that a message store may also be included in FIG. 1B for the same purpose. A company (e.g., Company X) or enterprise may then, with the consent from the user, send direct and personalized A2P campaign messages or information on services to the user in accordance with the user preferences. The consent from the user may be provided as a pre-consent including user consent preferences that is sent from the user device (client) at a given time. The consent may then be stored in the user account at the consent AS. The user may also choose to accept or reject a consent to a provider of a message by means on an interface (e.g., graphical or text) that is prompted to the user at a time it receives the message, but before it is presented. The interface may allow the user to take an action that may then be sent back to the consent AS to be stored to the user account of preferences. The embodiments herein are not restricted to any particular way a consent is provided by a user. The consent AS may enforce companies to adhere to user requirements and may return back or reject A2P messages that do not fulfill the user requirements. The consent AS exposes only the data (user preferences) that the user has agreed to share with companies, enterprises, etc. What information the user wishes to share may differ from company to company. It should be mentioned that the consent AS might be part of the operator of the network or it could be a shared public resource.

When a user receives a message from a company with a campaign that is not interesting for the user, the user may opt-out from continued communication regarding a certain product, service or from all communication from the company. The user may opt-out by accessing the assistant bot/agent through a contact in the client or by a plug-in menu in the client or by selecting or pressing "unsubscribe" in the received message. According to another embodiment, the user may update user preferences by sending a message to the consent AS.

The embodiments of the present invention hence allows a user to opt-in to or opt-out from receiving A2P campaign messages regarding products, product types, brand etc. by setting user preferences. The user preferences may describe the conditions that need to be met for the company/enterprise to send an offer, for example at specific date and time, at certain locations, at a certain velocity (while travelling in a car or in a train), etc.

As described earlier, the user can set the preferences through several methods which may include: via a chatbot assistant, through a plug-in settings menu, though speech recognition (interpreted with, e.g., Natural Language Processing (NPL)) or through some other interface that can support input expressing the information. The consent AS available to the RCS or IMS/SIP or HTTP network of the operator, will store the user preferences. An example of information that may be stored include, but is not limited to:

Service Id, Unique identifier per consent
Real User-id
First Name, Last Name
Share name
Gender
Share gender
Birth date
Share date
User MSISDN
Share MSISDN
User Alias
Share Alias
E-mail address Share e-mail address
Communication channel preference order
Interests
Share Interest
Subscription: (Company, category, product type, brand, campaign)
  Opt-in duration
  User preferences:
    Time
    Day
    Location
    Velocity
    Roaming
    Data-connection type
  Consent to share information with enterprises Below are examples where the user populated some general preferences about user interests, as well as some specific subscriptions to two companies (Norwegian and Coca Cola) selected by the user. Note that these are only example of companies, and the embodiments herein are not restricted to any particular type of company or enterprise.

Examples:
Service Id: General interests-AB12345678
Real User-id: sip:46727255550@ims.user.com
First Name: Alice
Last Name: Brown
Share Name: yes
Gender: Female
Share gender: yes
Birth date: 1 Jan. 1979
Share birth date: No
MSISDN: 46727255550
Share MSISDN: true
User Alias: tempuserXXX
Share alias: no
E-mail: alice@user.com
Share e-mail: no
Communication channel preference order: RCS, SMS, i-message, messenger
Interests: Football, Hunting, Dancing
Consent to share Interests: yes
Subscription: *
  Opt-in duration: unlimited
  User preferences
    Time: 06:30-23:00
    Day: weekdays
    Location: At home; Address
    Velocity: <20 km/h
    Roaming: yes
    Data-connection type: all
  Consent to share above information with enterprises: yes
Subscription: Coca-Cola
  Consent to share above information with enterprise: yes
  Campaign:
  Opt-in duration: 2018-02-28 to 2018-03-20
  User preferences
    Time: 09:30-21:00
    Day: all day
    Location: all
    Velocity: <20 km/h
    Roaming: no
    Data-connection type: wifi
Subscription: Norwegian
  Consent to share above information with enterprise: yes
  Opt-in duration: 2018-02-10 to 2018-11-30
  Campaign: Autumn campaign
  User preferences
    Time: 18.00-23:30
    Day: all day
    Location: home
    Velocity: n/a
    Roaming: no
    Data-connection type: all As shown above, the user preferences may include at least one of: information of reaching the subscriber, MSISDN, real user alias, subscription information, information on a time period during which the user accepts to receive A2P campaign messages; information on a data connection type for receiving the messages, the location where the user wishes to receive the messages, the time of day when to receive the messages, an email address, etc. Available network knowledge may be utilized to collect the position of the UE and also the speed or velocity of the UE. This can be performed by analyzing the UE pattern and speed movement to determine the location of the UE. Together with additional data such as WiFi SSID, the whereabouts of the UE may be determined.

The consent AS exposes the user preferences to the companies, enterprises, aggregators, etc., through the API. An enterprise may then, with the consent of the user, send A2P messages to the user. The user may receive messages from different companies that offer a specific product that is of interest of the user. As an example, if a user is interested in a specific brand for a specific product (e.g., a TV), the user may give consent to receive A2P messages from different companies that offer this specific product.

Figure 2:
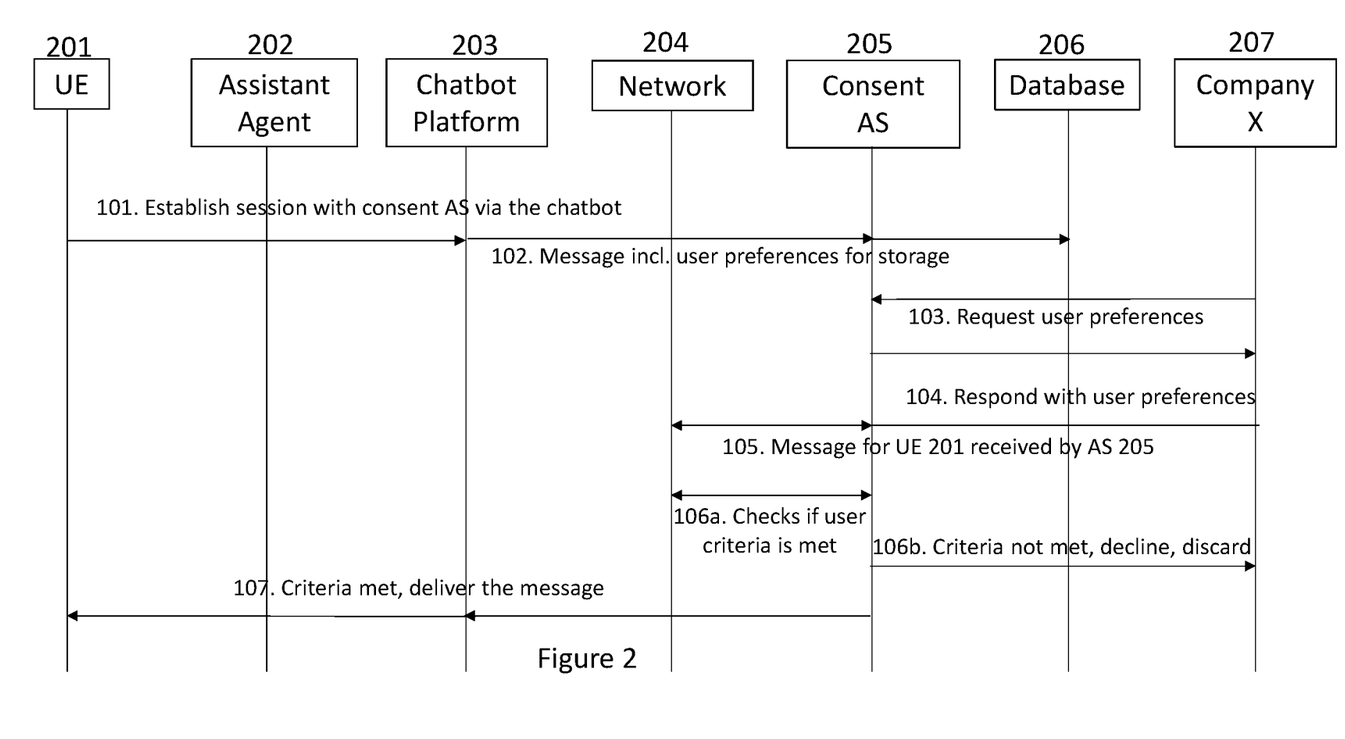
FIG. 2 is an example scenario involving a user initial opt-in to A2P messaging according to some embodiments herein.

Referring to FIG. 2, there is illustrated an example scenario involving a user initial opt-in to A2P messaging according to an exemplary embodiment herein.

The actions performed include:

(101) The user by means of UE 201 establishes a session with the consent AS 205 via the chatbot platform or via the assistant agent 202. The user may be provided with a suitable client application, e.g., a RCS client, a IMS/SIP client, etc.

(102) Transmitting a message to the consent AS 205. The message includes user preferences which are stored in the database 206. The message may be a SIP INVITE message or a HTTP REST (Representational state transfer) message or a MSRP (Message Session Relay Protocol) message or any suitable bearer message to carry the user preferences to the consent AS 205.

(103) Assuming here that a company X 207 is interested in sending campaign messages to the user. The company X 207 requests the consent AS 205 for users (or user preferences) which have given consent to receive information regarding their product or company.

(104) Consent AS 205 responds to Company X 207 with the information including user preferences that the user has chosen to share with this company.

(105) Company X 207 sends out at least one A2P campaign message towards UE 201. This message is transmitted via the network 204 and is received by the consent AS 205.

(106*a*) The content AS 205 checks if the requirements (or criteria) of the user, according to the user preferences, is/are met.

(106*b*) If the requirements is/are not met, the A2P message from Company X 207 may be returned to Company X 207, discarded or declined by the consent AS 205.

(107) If the requirements is/are met, the A2P message is delivered to the UE 201 via the chatbot platform 203. Hence, the UE 201 receives the A2P message(s) including information on services or campaigns that fulfil the requirements of the user in accordance with the user preferences.

Figure 3:
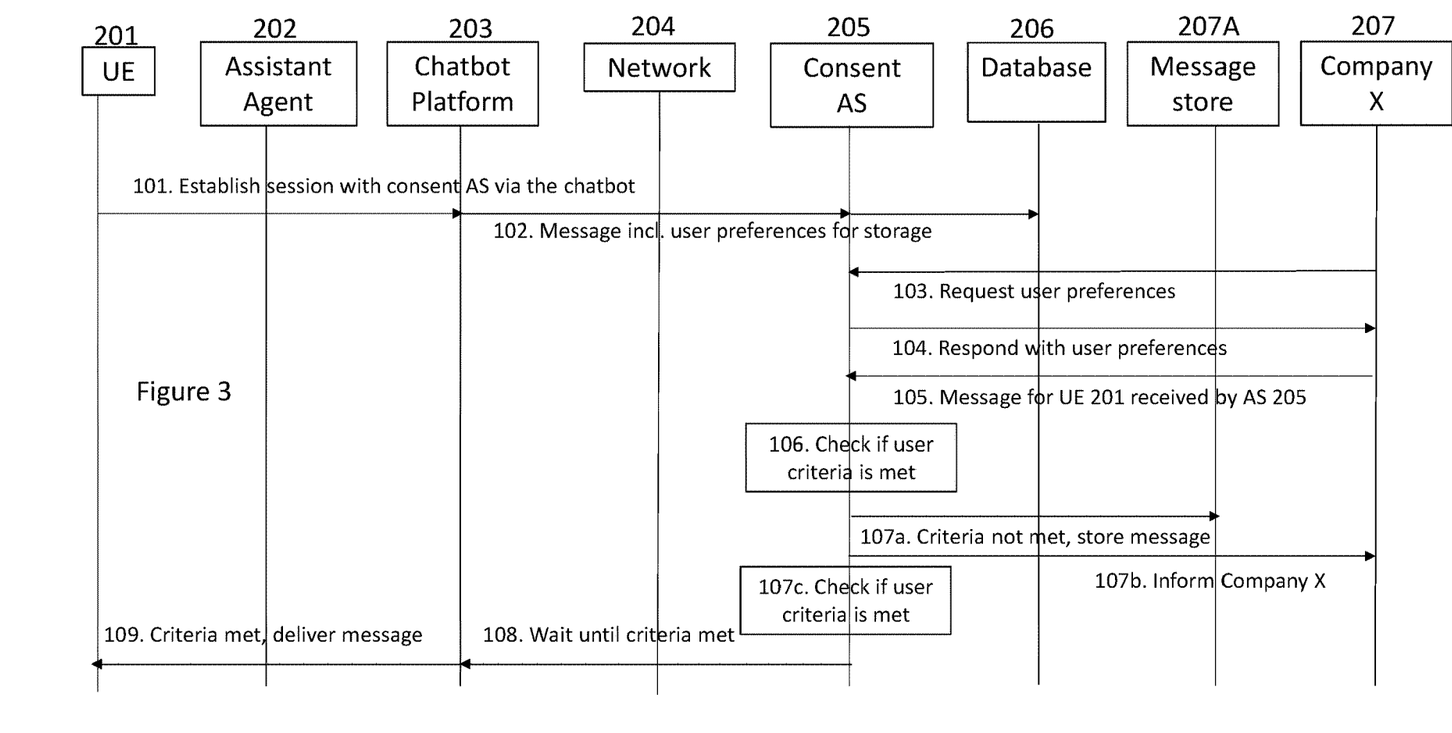
FIG. 3 is an example scenario involving a user opting-in to A2P messaging, wherein the delivery of the messages is delayed, according to an embodiment herein.

FIG. 3 illustrates an example scenario involving a user opt-in to A2P messaging according to another exemplary embodiment herein. The actions 101-105 are similar to those of FIG. 2.

(106) The consent AS 205 is triggered and the consent AS 205 checks if user criteria is fulfilled for the message.

(107a) The consent AS 205 considers if the criteria is/are not met. For example, the criteria of the user with regards to the time period during which the message should be delivered is not met. In this case, the message is stored in a message store 207A until it can be delivered at a later time. Hence, the delivery of the message is delayed until the criteria of the user is fulfilled.

(107b) The consent AS 205 informs Company X 207 that the delivery of the message will be delayed and instead it will be delivered to the user, e.g., during daytime (user local daytime).

(107c) The consent AS 205 checks again against user preferences if user criteria is/are met to see that the criteria has/have not been changed.

(108) The consent server waits until the criteria is/are met.

(109) When the criteria is/are met, the A2P message is delivered to the UE 201 via the chatbot platform 203.

It should be noted that the criteria above (i.e., delivery during daytime) is only an example. Other criteria or a combination of different criteria may be used. As an example, a criteria may be "delivery of messages only during daytime" and another criteria "delivery only when the user is at home." A combination would be: "delivery of message(s) during daytime but only when user is at home."

As described above, the solution according to the embodiments herein allow users to store their preferences at the consent AS. In addition to the different ways to do that, the user may also express in natural language the preferences for directed campaigns that the user is interested in. For example, if using a voice or text API, the user could say: "Let me see/receive adverts/campaigns about a Smart-TV with 52 inch screen, I don't want to be disturbed by adverts/campaigns at night from 22:00-07:00 and I don't want to be disturbed while driving a car."

The user preferences may be presented to the user on an interface. The preferences would then be sent and stored in the consent AS or in the database. Another means for the user to share preferences could be achieved by downloading a consent application plug-in to the RCS or IMS/SIP client (or any suitable client) and the user may enter the preferences in the graphical interface. The preferences settings could also be included in the built in client on a UE to be created and changed by the user. As described earlier, an API (e.g., A REST API) is configured to expose user preferences towards companies, aggregators and other operators for interconnection. A company that wishes to send campaign messages towards a user will send messages through an aggregator towards the operator RCS or IMS/SIP or HTTP network.

Figure 4:
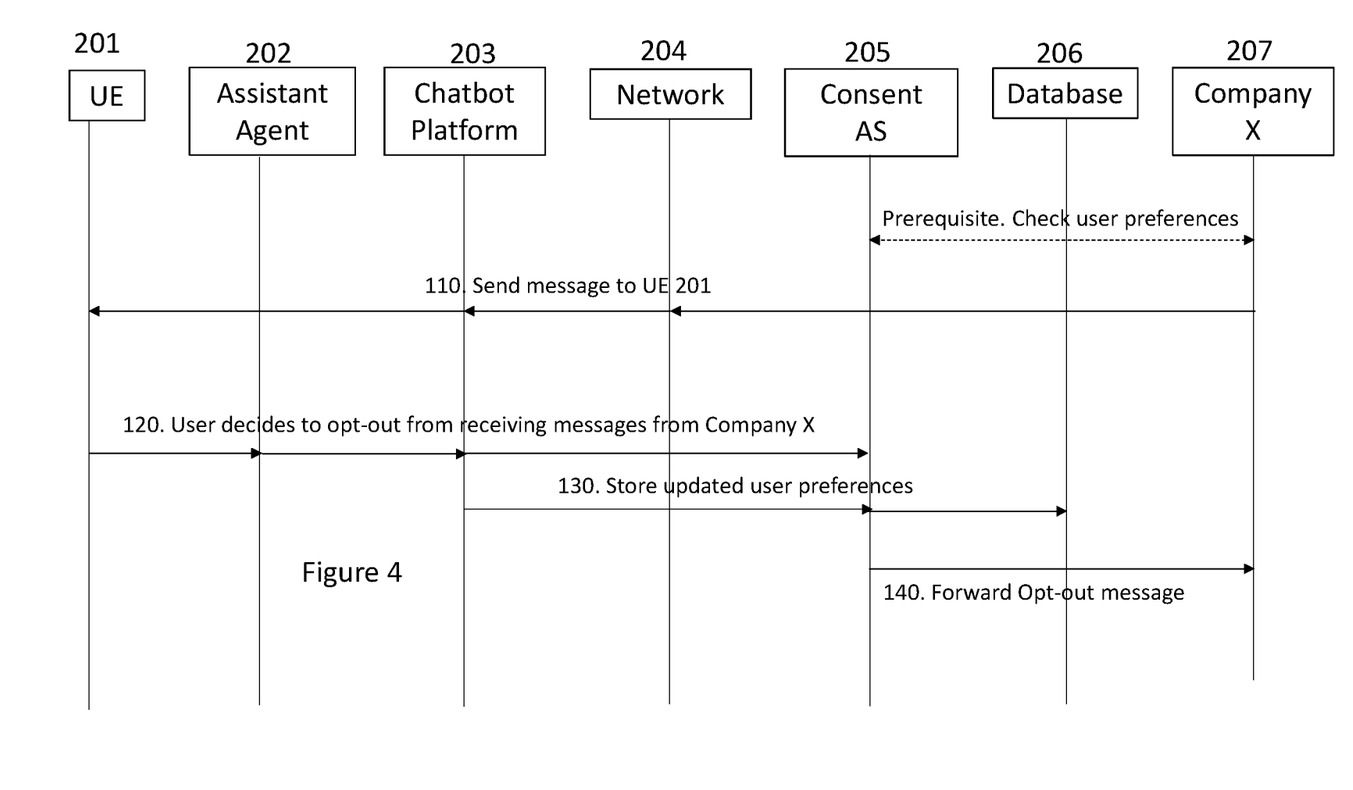
FIG. 4 is an example scenario involving a user opting-out from receiving A2P messaging, according to an embodiment herein.

A user may also decide to opt-out from receiving A2P messages from a company. FIG. 4 illustrates such a scenario in accordance with an embodiment herein. A prerequisite is that Company X 207 has already checked user preferences with the consent AS 205, for example through a request to the API of the consent AS 205. The actions performed include:

(110) Company X 207 sends a A2P message to the UE 201 via the network 204 which is forwarded via the chatbot platform 203.

(120) The user via UE 201 decides to opt-out from receiving further messages from Company X 207, or decides to opt-out from receiving specific information or messages regarding a particular product. The user may do so through several means: as an example, by starting a session with the assistant agent 202 or the chatbot 203 and send a message towards the consent AS 205 for updating the user preferences. The message may be a SIP INVITE message or a HTTP REST message or a MSRP. Alternatively, the user may click on an unsubscribe link in the A2P message received from Company X. The UE 201 may also send to the consent AS 205 an unsubscribe request message. Alternatively, the user of the UE 201 may open a plug-in menu of the RCS or IMS/SIP client of UE 201 and update the user preferences. The user may also select to blacklist Company X using the client local blacklist.

(130) The consent AS 205 is informed of the changes made by the user and the content AS 205 stores the new (or updated) user preferences in the database 206.

(140) The consent AS 205 sends an opt-out message to Company X 207 which ceases to send campaign messages to the UE 201. If the user preferences have been updated, the consent AS 205 may also inform Company X 207 of the new preferences.

Figure 5:
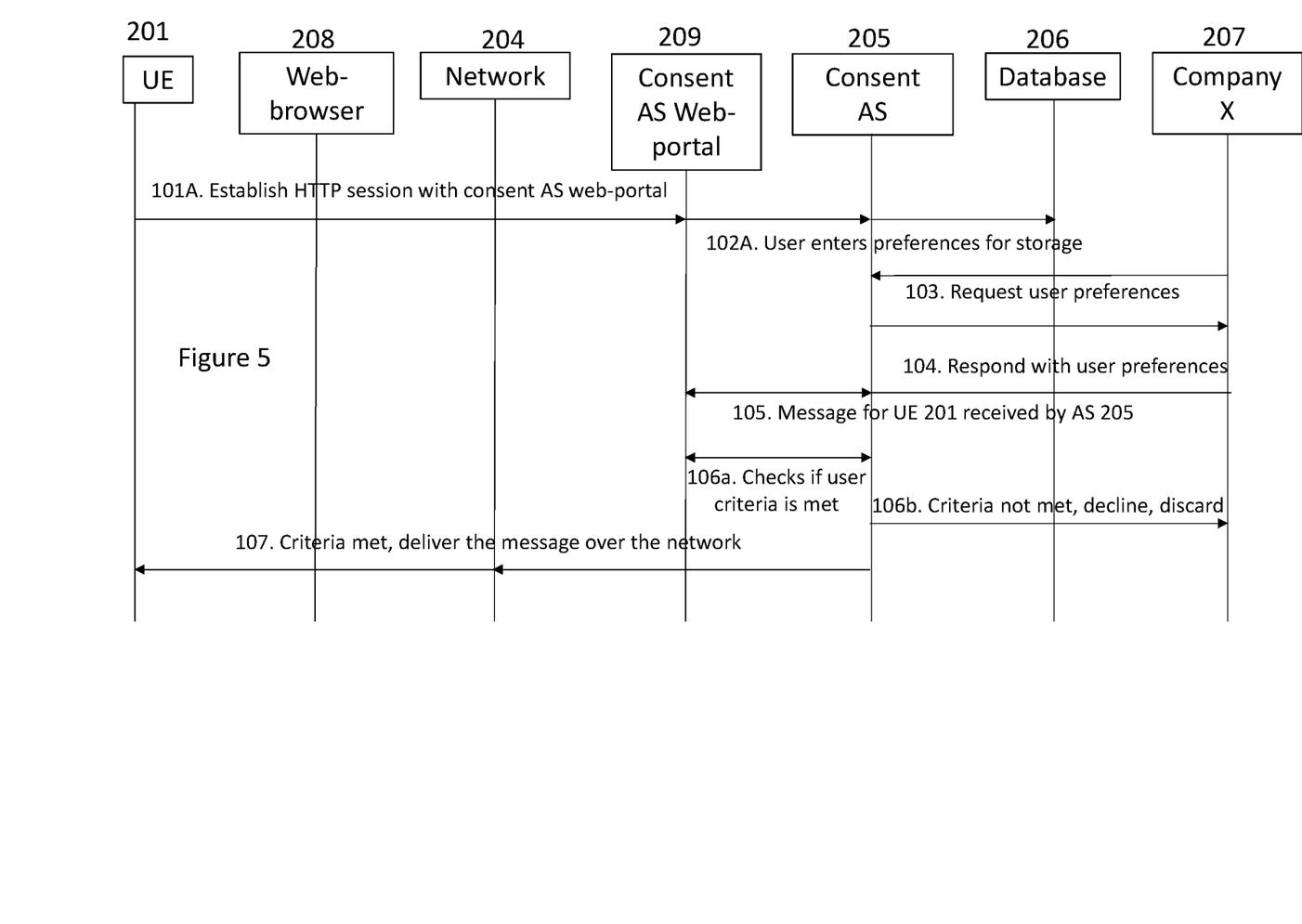
FIG. 5 is an example scenario involving a user opting-in to A2P messaging, according to an exemplary embodiment herein.

Referring to FIG. 5, there is illustrated an example scenario involving a user initial opt-in to A2P messaging according to an exemplary embodiment herein using HTTP interface. In this scenario, a web-browser 208 is used instead of an assistant agent. This scenario also involves a consent AS web-portal 209.

The actions performed include:

(101A) The user, by means of UE 201, establishes a session with a consent AS web-server 209 via HTTP interface in a web-browser 208 or other HTTP application.

(102A) Transmitting a message to the consent AS 205. The message includes user preferences which are stored in the database 206. The message may be a SIP INVITE message carrying a XML body or MSRP (Message Session Relay Protocol) body or a HTTP REST (Representational state transfer) message or any suitable bearer message to carry the user preferences to the consent AS 205. The message in step (102A) also includes an indication, of the user, to opt-in to receive A2P messages from at least one company.

(103) Assume here that a company X 207 is interested in sending campaign messages to the user. The company X 207 requests the consent AS 205 for users (or user preferences) which have given consent to receive information regarding their product or company.

(104) Consent AS 205 responds to Company X 207 with the information including user preferences that the user has chosen to share with this company.

(105) Company X 207 sends out at least one A2P campaign message towards UE 201. This message is received by the consent AS 205.

(106a) The consent AS 205 checks if the requirements (or criteria) of the user, according to the user preferences, is/are met.

(106b) If the requirements is/are not met, the A2P message from Company X 207 may be returned to Company X 207, discarded or declined by the consent AS 205.

(107) If the requirements is/are met, the A2P message is delivered to the UE 201 via a HTTP web-service application supporting A2P messaging. Hence, the UE 201 receives the A2P message(s) including information on services or campaigns that fulfil the requirements of the user in accordance with the user preferences.

Figure 6:
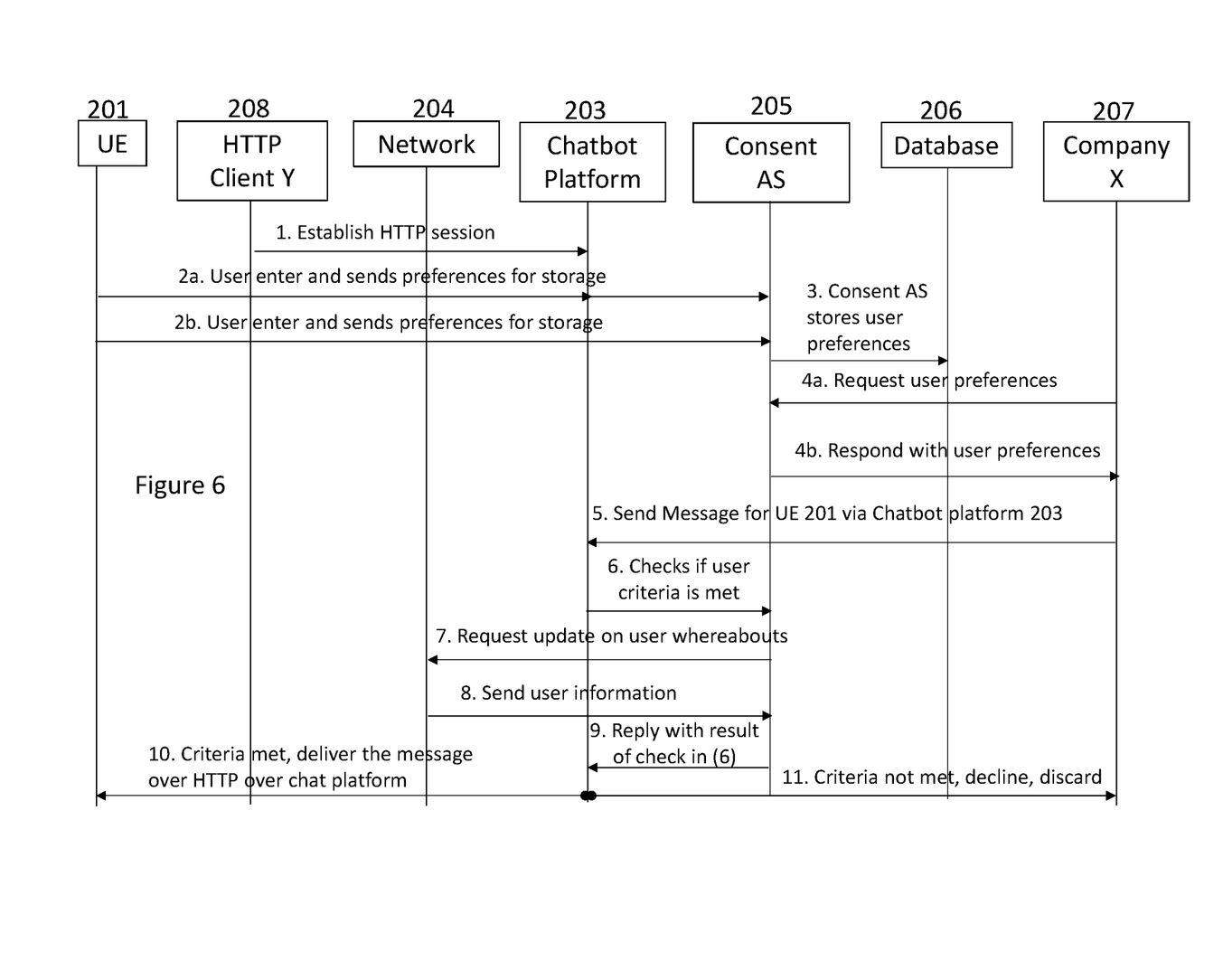
FIG. 6 is an example scenario involving delivery of A2P messages to a UE over HTTP.

Referring to FIG. 6, there is illustrated an example scenario communication flows in relation to FIG. 1B, i.e., when a chat platform provider is connected to the end user or UE (like WhatsApp, or Facebook messenger). In this scenario, information on user preferences and knowledge about those needed by the chatbot provider is communicated without operator interference. The chat platform may provide functions for allowing the user to change preferences through a menu or by the use of an automated agent.

In this scenario, the operator of the network 204 of the UE 201 provides information about the user's (or UE's) whereabouts speed of movement, etc., that will assist the preferences to be met.

The actions performed include:

(1) The user via HTTP client 208 establishes a HTTP session with the chatbot platform 203 for a chat service.

(2a) The user (or UE 201) establishes a HTTP session with the consent agent over the chat platform 203 which then relays the user preferences, entered by the user, to the consent AS 205 for storage in the database 206; or (2b) The user (or UE 201) establishes a HTTP session with the consent agent to consent AS 205 for storing the entered user preferences in the database 206.

(3) The consent AS 205 stores the user preferences in the database 206.

(4a) Assume here that a company X 207 is interested in sending campaign messages to the user. The company X 207 requests the consent AS 205 for users (or user preferences) which have given consent to receive information regarding their product or company.

(4b) The consent AS 205 responds to Company X 207 with the information including user preferences that the user has chosen to share with this company.

(5) Company X 207 sends out at least one A2P campaign message towards UE 201 via the chatbot platform 203, which message is received by the chatbot platform 203.

(6) The chatbot platform 203 checks if user criteria is/are met by sending a request to the consent AS 205 which performs the checking.

(7) The consent AS 205 requests, from the network 204, an update on user whereabouts or data that relate to the user preferences (e.g., location, speed of movement, etc.) that can affect the decision to send the message to the user (or UE 201) at the desired time. Note, that in case the user belongs to a plurality of networks, the consent AS 205 may use, e.g., the MSISDN in the user preferences to identify the network(s) to which request(s) for an update is to be sent.

(8) The network 204 replies and sends updated user information to the consent AS 205 for processing and validation together with user preferences.

(9) The consent AS 205 replies with the result of the check in step 6.

(10) If criteria is/are met, the chatbot platform 203 delivers the message previously received from Company X to the user HTTP client 208 or to UE 201 over HTTP.

(11) If the criteria is/are not met, the chatbot platform 203 responds to Company X with the result of unsuccessful delivery due to the criteria not being met. As an example, the previously received A2P message from Company X 207 (step (5)) may be returned to Company X 207, discarded or declined by the consent AS 205.

Figure 7:
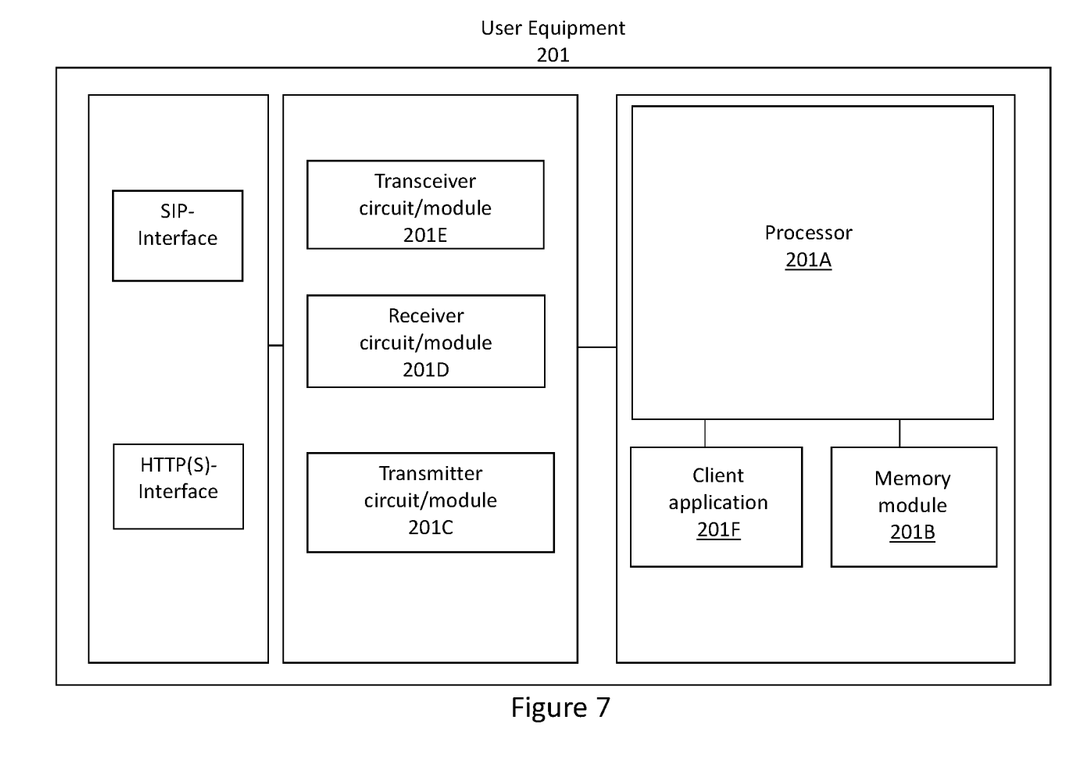
FIG. 7 illustrates a block diagram of a UE according to an embodiment herein.

In order to perform the method steps or actions described earlier, there is provided a UE 201 as shown in FIG. 7. UE 201 comprises a processing circuit or a processing module or a processor 201A; a memory module 201B; a transmitter circuit or transmitter module 201C; a receiver circuit or receiver module 201D; and a transceiver circuit or transceiver module 201E which may include the transmitter circuit 201C and the receiver circuit 201D. The UE 201 is also provided with suitable interface(s), a SIP interface and a HTTP(S) interface. The UE 201, for example, a mobile phone, a cell phone, a smart phone, a tablet, a PDA, etc., may support any of radio access technologies including 2G, 3G, 4G, 5G, Wifi, Wimax or a combination thereof. The UE 201 is provided which a suitable client, e.g., RCS client, IMS/SIP client 201F, etc., as previously described.

The processing module/circuit 201A includes a processor, microprocessor, an application specific integrated circuit (ASIC), field programmable gate array (FPGA), or the like, and may be referred to as the "processor 201A." The processor controls the operation of the UE 201 and its components. Memory (circuit or module) 201B includes a random access memory (RAM), a read only memory (ROM), and/or another type of memory to store data and instructions that may be used by processor 201A.

The processor 201A is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 201A to carry out the operations of the UE 201. The memory 201B contains instructions executable by the processor wherein the UE 201 is operative to or is configured to: establish a session with an application server; transmit a message to said application server, wherein the message includes user preferences relating to services or campaigns that the user of the UE 201 is interested in. The UE 201 is further operative to receive at least one A2P message including information on said services or campaigns that fulfill the requirements of the user in accordance with the user preferences. The message from the UE 201 represents the user's consent to the application server to share user preferences with companies, enterprises, etc. The UE 201 is operative to establish a session with the application server via an agent assistant or via a chatbot platform of an operator of a network. As previously described, when the user of the UE 201 decides to opt-out from receiving information from a company, the UE 201 informs the application server by updating user preferences or by sensing an unsubscribe request message to the server. Additional details regarding the actions that may be performed by the UE have already been described.

Figure 8:
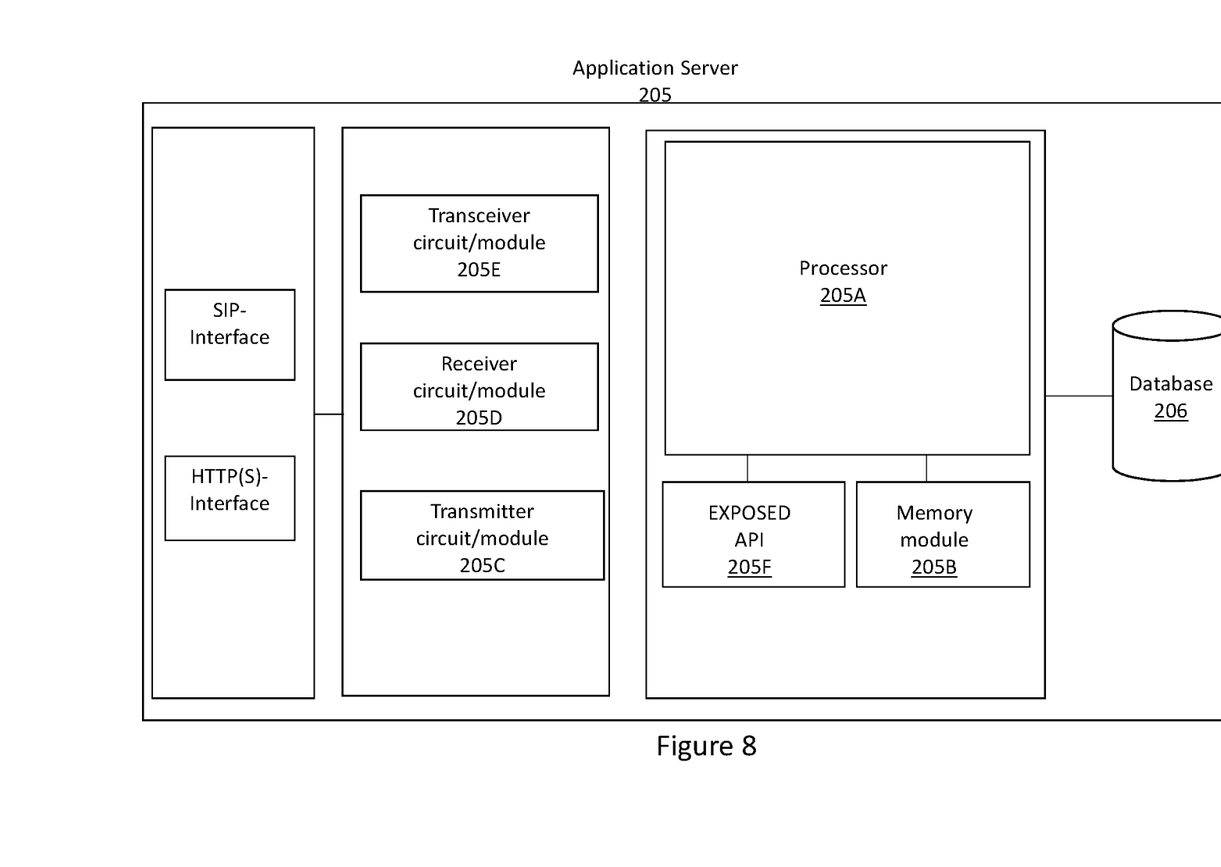
FIG. 8 illustrates a block diagram of a consent application server according to an embodiment herein.

FIG. 8 illustrates a block diagram of a (consent) application server 205 in accordance with previously described embodiments. The consent AS 205 comprises a processing circuit or a processing module or a processor 205A; a memory module 205B; a transmitter circuit or transmitter module 205C; a receiver circuit or receiver module 205D; a transceiver circuit or transceiver module 205E which may include the transmitter circuit 205C and the receiver circuit 205D, an exposed API 205F, and a database 206. The consent server 205 is also provided with suitable interface(s), a SIP interface and a HTTP(S) interface. The processing module/circuit 205A includes a processor, microprocessor, an application specific integrated circuit (ASIC), field programmable gate array (FPGA), or the like, and may be referred to as the "processor 205A." The processor controls the operation of the AS 205 and its components. Memory (circuit or module) 205B includes a random access memory (RAM), a read only memory (ROM), and/or another type of memory to store data and instructions that may be used by processor 205A. As previously described the exposed API 205F allows user preferences to be exposed to companies, enterprises, aggregators and other operators that have connections to the consent AS 205.

The processor 205A is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 205A to carry out the operations of the AS 205. The memory 205B contains instructions executable by the processor wherein the AS 205 is operative to or is configured to: establish a session with UE (e.g., UE 201); receive a message from the UE, wherein the message includes user preferences relating to services or campaigns that the user of the UE is interested in. The AS 205 is further operative to transmit at least one A2P message including information on said services or campaigns that fulfill the requirements of the user in accordance with the user preferences (which are stored in database 206). The A2P message is generated by a company and is received by the AS 205 before being sent/delivered to the UE if the criteria of the user of the UE is met. The AS 205 is therefore operative to check whether the content of the A2P message fulfils the user criteria according to the user preferences. If the content of the A2P message fails to fulfil the user criteria, the AS 205 is operative to store the A2P message in the database 206. The AS 205 is further operative to deliver the A2P message, stored in the database 206, to the UE when the criteria of the user with regards to all the user preferences is met. The AS 205 is further operative to receive from the UE an (opt-out) message including information that the user of the UE decided to opt-out from receiving information or campaign messages from at least one company selected by the user of the UE. The AS 205 then forwards the message to the selected company. The AS 205 sends the opt-out message to the selected company which ceases to send campaign messages to the UE. If the user preferences have been updated, the AS 205 is operative to inform the company of the new user preferences.

Throughout this disclosure, the word "comprise" or "comprising" has been used in a non-limiting sense, i.e., meaning "consist at least of." Although specific terms may be employed herein, they are used in a generic and descriptive sense only and not for purposes of limitation. In particular, the embodiments herein may be applicable is any wired or wireless systems, including 3G, 4G, 5G, WiMax, etc.

The invention claimed is:

1. A method performed by a User Equipment, UE, the method comprising
establishing a session with an application server;
transmitting a message to said application server, wherein the message includes user preferences relating to services or campaigns that the user of the UE is interested in, the message including the user preferences further includes the user's consent to the application server to share user preferences with companies;
receiving at least one automated Application-to-Person, A2P, message from a company's software application including information on said services or campaigns that fulfil requirements of the user in accordance with the user preferences; and
when the user of the UE decides to opt out from receiving information from at least one company,
informing the application server of said decision.

2. The method according to claim 1, wherein establishing a session with the application server is performed via an agent assistant or via a chatbot platform of an operator of a network.

3. The method according to claim 1, wherein the user preferences include at least one of: information on a time period during which the user accepts to receive said at least one A2P message; information on a data connection type for receiving the at least one A2P message; and information on a location where the user accepts to receive the at least one A2P message.

4. The method according to claim 1, wherein informing the application server of said decision comprises updating user preferences.

5. The method according to claim 1, wherein informing the application server of said decision comprises sending an unsubscribe request message to the application server.

6. The method of claim 1, wherein the user's consent to share user preferences with companies may include preferences that differ from company to company.

7. A method performed by an application server, the method comprising:
establishing a session with a User Equipment, UE;
receiving a message from said UE, wherein the message includes user preferences relating to services or campaigns that the user of the UE is interested in, the message including the user preferences further includes the user's consent to the application server to share user preferences with companies;
transmitting at least one automated Application-to-Person, A2P, message from a company's software application including information on said services or campaigns that fulfil the requirements of the user in accordance with the user preferences; and
receiving from the UE, a message including information that the user of the UE decided to opt out from receiving information or campaign messages from at least one company selected by the user of the UE.

8. The method according to claim 7, wherein establishing a session with the UE is performed via an agent assistant or via a chatbot platform of an operator of a network.

9. The method according to claim 7, wherein the user preferences include at least one of: information on a time period during which the user accepts to receive said at least one A2P message; information on a data connection type for receiving the at least one A2P message; and information on a location where the user accepts to receive the at least one A2P message.

10. The method according to claim 7 further comprising:
receiving, from at least one company, a campaign message;
checking whether the content of said campaign message fulfils user criteria according to the user preferences, and
delivering the campaign message to the UE as an A2P message.

11. The method according to claim 10, wherein, if the content of the campaign message fails to fulfil the user criteria according to at least one user preference, storing the campaign message in a database.

12. The method according to claim 7, wherein the message from the UE is an unsubscribe request message.

13. The method according to claim 7, further comprising forwarding the message to the selected at least one company.

14. A User Equipment, UE comprising a processor and a memory containing instructions executable by the processor, wherein the UE is operative to:
  establish a session with an application server;
  transmit a message to said application server, wherein the message includes user preferences relating to services or campaigns that the user of the UE is interested in, the message including the user preferences further includes the user's consent to the application server to share user preferences with companies;
  receive at least one automated Application-to-Person, A2P, message from a company's software application including information on said services or campaigns that fulfil the requirements of the user in accordance with the user preferences; and
  when the user of the UE decides to opt out from receiving information from at least one company,
  inform the application server of said decision.

15. An application server, comprising a processor and a memory containing instructions executable by the processor, wherein the application server is operative to:
  establish a session with a User Equipment, UE;
  receive a message from said UE, wherein the message includes user preferences relating to services or campaigns that the user of the UE is interested in, the message including the user preferences further includes the user's consent to the application server to share user preferences with companies;
  transmit at least one automated Application-to-Person, A2P, message from a company's software application including information on said services or campaigns that fulfil the requirements of the user in accordance with the user preferences; and
  receive from the UE a message including information that the user of the UE decided to opt out from receiving information or campaign messages from at least one company selected by the user of the UE.

* * * * *